United States Patent [19]

Shank et al.

[11] Patent Number: 5,063,513

[45] Date of Patent: Nov. 5, 1991

[54] VEHICLE PREHEATER CONTROL

[75] Inventors: David W. Shank, Big Rapids; Nadi S. Findikli, Reed City, both of Mich.

[73] Assignee: Nartron Corporation, Reed City, Mich.

[21] Appl. No.: 538,900

[22] Filed: Jun. 15, 1990

[51] Int. Cl.5 .................... B60H 1/22; G05D 23/00
[52] U.S. Cl. .................... 364/424.05; 123/142.5 R; 123/142.5 E; 219/202; 219/205; 219/208; 237/12.3 R; 237/12.3 B; 237/12.3 C
[58] Field of Search .................. 364/424.05, 424.01; 123/179 H, 179 B, 142.5 E, 142.5 R; 237/12.3 R, 12.3 A, 12.3 B, 12.3 C, 2 A; 219/202, 205, 208

[56] References Cited

U.S. PATENT DOCUMENTS

| | | | |
|---|---|---|---|
| 4,372,261 | 2/1983 | Sarto | 123/142.5 E |
| 4,378,486 | 3/1983 | Yunik et al. | 219/202 X |
| 4,694,145 | 9/1987 | Romstadt et al. | 123/179 H X |
| 4,700,888 | 10/1987 | Samulak | 219/205 X |
| 4,706,644 | 11/1987 | Nakai | 123/142.5 R X |
| 4,847,468 | 7/1989 | Hufstetler | 237/12.3 A |
| 4,858,825 | 8/1989 | Kawamura | 237/12.3 C X |
| 4,925,091 | 5/1990 | Yanagihara | 237/12.3 A |
| 5,012,070 | 4/1991 | Reed | 219/202 |

OTHER PUBLICATIONS

Volvo Genuine Accessories Water Heater Manual: (unknown Date).

*Primary Examiner*—Thomas G. Black
*Assistant Examiner*—Thomas S. Auchterlonie
*Attorney, Agent, or Firm*—Watts, Hoffman, Fisher & Heinke Co.

[57] ABSTRACT

A control unit for operating an auxiliary vehicle heater at cold temperature. The unit can be preprogrammed or manually actuated and includes a plurality of sensors and control outputs for operating the auxiliary heater. The time of operation is based upon sensed ambient temperature. A compartment fan is operated automatically by the control unit to warm the passenger compartment.

14 Claims, 13 Drawing Sheets

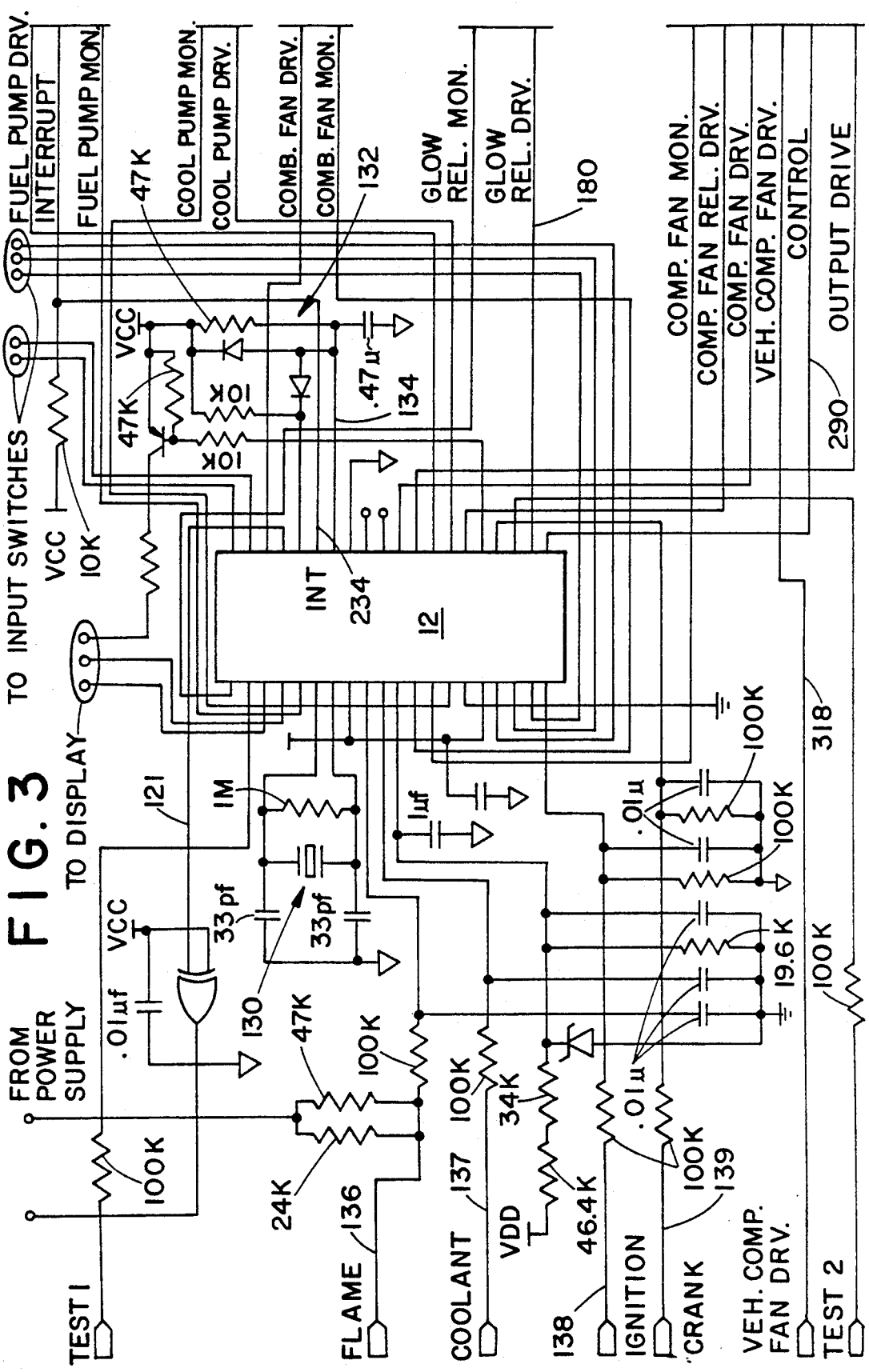

VEHICLE PREHEATER CONTROL

BACKGROUND OF THE INVENTION

The present invention relates to a control for an auxiliary heater used to preheat a motor vehicle passenger compartment.

FIELD OF THE INVENTION

In cold weather, especially on very cold mornings, it takes some time for a motor vehicle passenger compartment to warm up to a comfortable temperature level. One solution is for the motorist to start the vehicle engine prior to its use and let the engine run for a period of ten to fifteen minutes so that heat can be directed to the passenger compartment as soon as the vehicle is entered.

A variation of the technique of manually starting the car utilizes a device having an rf transmitter which starts the engine from outside the vehicle. This avoids the need to enter the car and can in theory be accomplished without ever leaving the warm confines of one's home.

Running a vehicle engine prior to use of the vehicle is inefficient. The vehicle engine was designed to accomplish the primary task of moving the vehicle and was not intended for use as a preheater.

Prior to the advent of vehicle heaters which receive heat energy from the vehicle engine cooling system, it was known to utilize a separate gasoline fueled heater to heat the vehicle passenger compartment. Auxiliary heaters that separately transfer heat energy to the vehicle's cooling system are also know. These auxiliary heaters burn fuel from the vehicle's fuel tank and have a separate water pump and heat exchanger for delivering heat energy to the vehicle cooling system. These auxiliary heaters utilize the existing vehicle heater fan and can be manually or automatically activated. When automatically activated, a timer is used to initiate operation of the auxiliary heater at a predetermined time. For this application, the vehicle compartment fan is turned on and a time entered into a controller so that the auxiliary heater automatically initiates compartment heating at a predetermined time.

Use of an auxiliary preheater also warms the vehicle engine. This prolongs engine life and provides more efficient fuel combustion when the vehicle is started.

SUMMARY OF THE INVENTION

The present invention concerns a control unit for activating an auxiliary heater for heating a motor vehicle passenger compartment. The control unit provides flexible, energy efficient auxiliary heat in a safe manner.

Apparatus constructed in accordance with one embodiment of the invention includes an auxiliary heater for heating a motor vehicle passenger compartment prior to the starting of a motor vehicle. An energy source separate from the motor vehicle engine transfers heat to the motor vehicle engine cooling system. A pump routes coolant through the motor vehicle engine cooling system as the heat is being transferred.

An input and control device mounted to the vehicle, preferably on the vehicle dashboard, allows the motorist to actuate one or more auxiliary heating control functions. A control system responds to these inputs by causing the auxiliary energy source to deliver heat to the cooling system and preheat the passenger compartment and vehicle engine before a projected user vehicle start time. The control system includes a sensor that senses the temperature and determines a time interval the auxiliary energy source is to operate based upon the sensed temperature.

At higher temperatures the time period needed by the auxiliary heater to bring the passenger compartment up to a comfortable temperature is less than the time period required at lower temperatures. By adjusting the operation of the auxiliary energy source based upon sensed temperature, an energy savings is achieved.

In accordance with a preferred embodiment of the invention the control system includes a timer for storing the projected vehicle start time rather than the initiation time for the auxiliary heater. The control system calculates the auxiliary heater operation then uses this projected start time in determining the period of operation for the auxiliary heater.

Multiple start times can be programmed by the user. In a typical application, one start time would correspond to the time which the motorist leaves for work and a second start time would correspond to the time the motorist leaves work for his or her home. Since the outside air temperature can differ widely for these two times, the control system may operate the auxiliary heater for widely different time periods at these two times.

From the above it is appreciated the one object of the invention is a control for operating an auxiliary heater for use with a motor vehicle. This and other objects, advantages and features of the invention will become better understood from a detailed description of a preferred embodiment which is described in conjunction with the accompanying drawings.

BRIEF DESCRIPTION OF THE DRAWINGS

FIG. 3 is a detailed schematic of a microprocessor controller and circuitry interfacing the microprocessor controller;

BEST MODE FOR PRACTICING THE INVENTION

Figure 1:
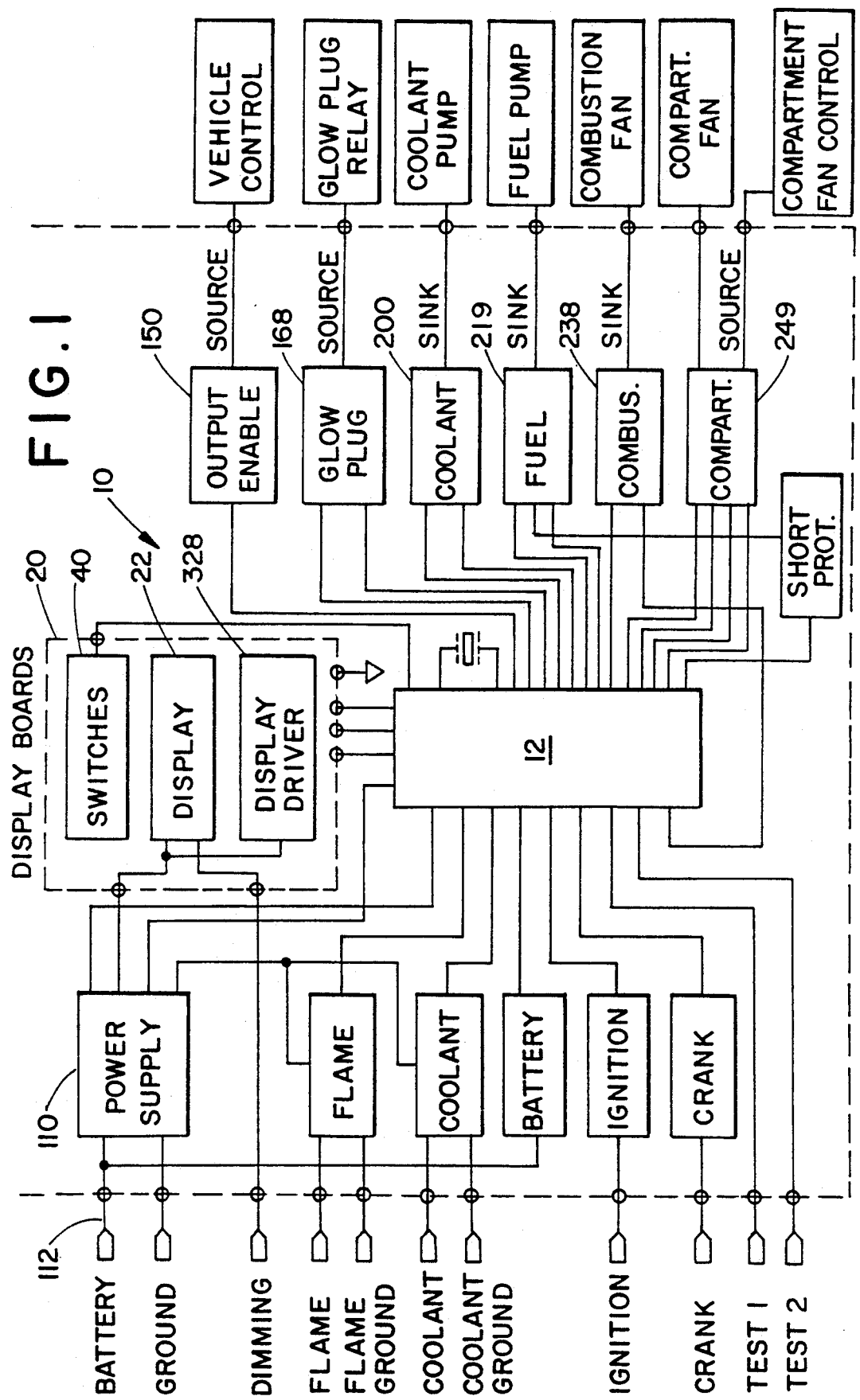
FIG. 1 is a schematic overview of a control system constructed in accordance with the invention.

Turning now to the drawings, FIG. 1 depicts a control system 10 having a microprocessor 12 for executing a control algorithm stored within a microprocessor memory unit.

The microprocessor 12 includes a plurality of input and output pins for accomplishing the control algorithm programmed within the memory. Generally, the microprocessor 12 includes a mechanism for accepting user entered inputs via a dashboard mounted input panel 20 (FIG. 2) and responds to those inputs by generating control outputs for activating an auxiliary heater mounted within the vehicle engine compartment.

The auxiliary heater includes a combustion chamber that burns fuel routed to the combustion chamber by an auxiliary fuel pump. In addition, a combustion fan delivers a controlled air flow to the combustion chamber. A glow plug mounted within the combustion chamber is energized by the control system 10 a predetermined time prior to a projected vehicle start time to initiate combustion. During auxiliary heater operation an auxiliary coolant pump is also controlled to circulate coolant through the engine block and the vehicle heater core.

CONTROL SYSTEM OPERATION

The auxiliary heater can be activated in response to a manual input. It can also be automatically activated at a preset time, a quick set time, or the time of engine start. Each time the system is activated, it begins an "operational period." The operational period will be a maximum of 40 minutes if the vehicle engine is off (although, as seen below, it may be less than 40 minutes) and 15 minutes if the engine is running.

The engine is determined to be running following crank 139 being sensed high with ignition (138) remaining high. The engine is determined to be off following ignition (138) being sensed low.

To activate the system manually, a switch on the input panel 20 is depressed. Automatic system operation can be initiated in three ways. The first is in response to an enabled preset (there are two preset times available). The preset function allows the operator to program an intended vehicle start time. This is the time that he or she intends to use the vehicle.

A second means of automatic system start up is a response to a quick set input. The quick set function permits the operator to manually enter the next auxiliary heater shutdown time. In the quickset mode the present time of day plus sixty minutes is displayed. Thus, if the time of day is 10:00 am the display will read 11:00 am. Subsequent actuation of a quick set input adds thirty minutes to the display until a desired vehicle start time is reached.

Either of these first two automatic starts is performed as follows. The controller 10 "wakes up" 40 minutes prior to the preset vehicle start time and examines the coolant temperature. Based on the temperature, the microprocessor 12 will decide when to start the auxiliary preheater. Upon start, an appropriate one of two preset indicators or the quick set indicator on the input 20 will be turned off.

The third method of commencing an automatic start up is auto start. The auto start function is invoked whenever the vehicle is started. If the coolant temperature is less than or equal to 0° C. upon vehicle start, the preheater system will begin a 15 minute operational period. (Should the coolant temperature reach 75° C. during this period, the preheater will be shut off.)

Figure 14:
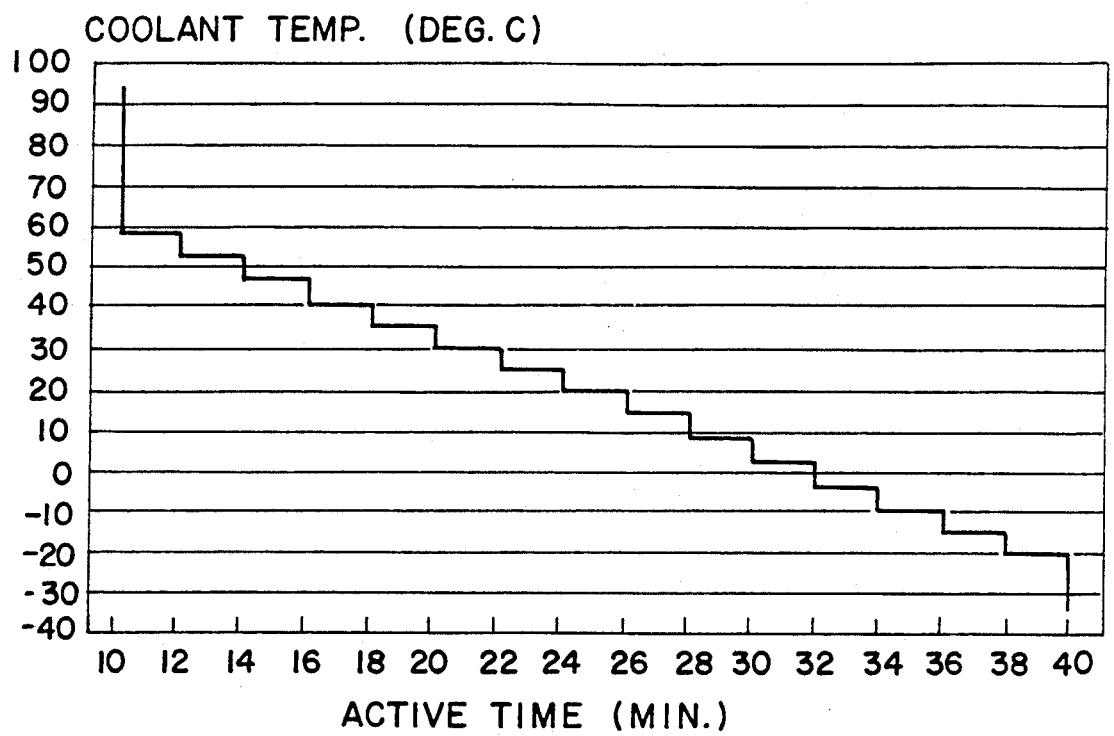
FIG. 14 is a graph showing auxiliary heater operating time as a function of sensed temperature.

When the control system 10 is actuated in response to a user input preset time, it senses the ambient temperature to determine how long the auxiliary heater should operate. FIG. 14 is a chart showing the operating period as a function of sensed temperature. The stairstep function in this figure is stored in the microprocessor in non-volatile memory.

DASHBOARD DISPLAY MODES

Figure 2:
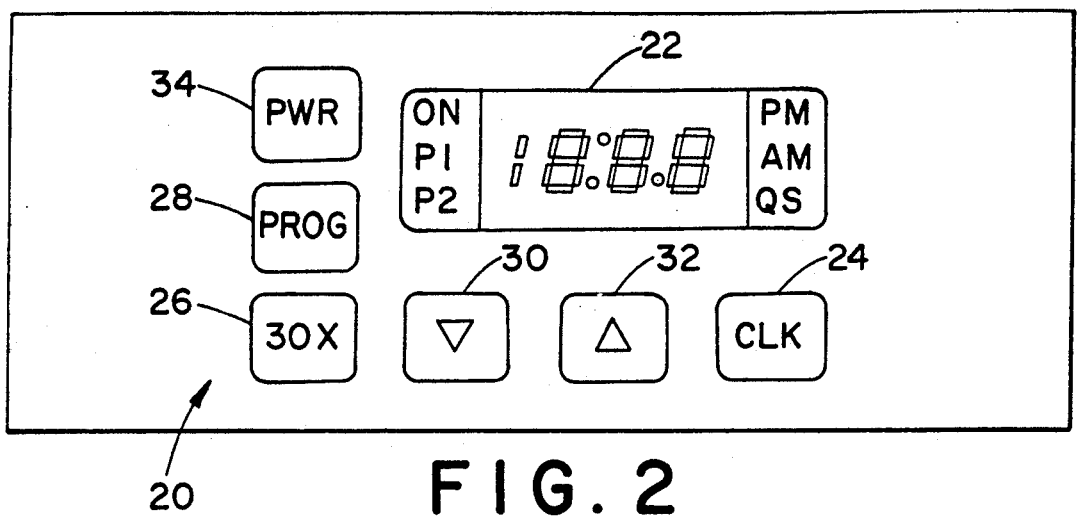
FIG. 2 is a depiction of a panel display for operating the FIG. 1 control system.

The input panel 20 depicted in FIG. 2 includes a visual display 22 that includes a number of light emitting diodes (LED) which, depending on the display mode, provide time of day, vehicle start time, minutes of preheater run remaining, and error messages to an operator. Additionally, diagnostic information may be presented on the display 22 to aid a technician in servicing the control system 10. Different modes can be selected by user actuation of one of a number of switches on the input panel 20.

In a clock mode, the time of day is displayed on the display 22. This mode is entered by depressing a clock (CLK) input button 24 or by a single actuation of a input button 26 designated "30X". After displaying the time of day for 10 seconds, the display 22 returns to a default mode in which no information is displayed.

By pressing a program input button (PROG) 28 an operator programmed vehicle start time is displayed on the display 22. After 10 seconds the display returns to the default mode in which no information is conveyed.

A slew mode allows the vehicle operator to set or change the time of day or the vehicle start time. To enter this mode the display must be in either a clock or preset mode subsequent to actuation of either the clock input button 24 or the program input button 28. The user then activates either of two slew control buttons 30, 32. This causes a colon between the hour and minute portion of the display 22 to flash at a rate of 1 cycle per second and the time displayed to be increased or decreased depending on which slew button is actuated.

The display 22 enters a so-called quick-set mode by depressing the "30X" button 26 at least twice within a 10 second interval. (Recall from above that by an initial actuation of this button causes the time of day to be displayed.) If the button is pressed twice within a ten second period, the display enters a quick set mode. In this mode the operator can quickly enter a vehicle start time by successively actuating the "30X" button.

A preheater mode in which the number of minutes remaining until preheater system shut down occurs is displayed whenever the preheater is active. This mode is entered whenever the preheat function is activated automatically through operation of the control system 10 or manually by pressing a power input button (PWR) 34 on the input panel 20. When the preheater shuts down the display 22 automatically returns to the default mode in which the display is blank.

If a system malfunction occurs, the display 22 automatically enters an error mode. The diagnostic mode can be entered by pressing the program (PROG) and "30X" buttons 26, 28 simultaneously for a period of 3 seconds. The display 22 then cycles through 2 phases, it first enters a diagnostics mode and then a failure history mode.

Six lamps (FIGS. 2 and 4) are integrated within the display panel 20 and provide additional information to the user. An "ON" lamp to the left of the display 22 is activated whenever the preheater combustion unit is operating. A lamp designated P1 is actuated to indicate that a first preset vehicle start time has been entered and is active. This first preset vehicle time corresponds to one preset time at which the preheater control is to actuate auxiliary preheater operation. A second lamp designated P2, also to the left of the display 22 is activated to indicate that a second preset vehicle start time has been entered.

A lamp designated QS to the right of the display 22 corresponds to a quick set status and is activated whenever the display is in the quick set mode. In this mode the operator can quickly reset the vehicle start time. The two lamps designated "AM" and "PM" indicate the time of day displayed is either antemeridian or postmeridian.

SWITCH INPUTS

The push button inputs control the preheater operation and are momentary dome switches with positive tactile feedback. Each button is backlighted with instrument panel lighting. These buttons control the state of six switches 24s, 26s, 28s, 30s, 32s, 34s in a switch circuit 40 coupled to the microprocessor and depicted in FIG. 5.

The power button 34 turns on and off the preheater unit. Depressing this button when the preheater unit is off will initiate system activation, light the "ON" indicator lamp, and put the display 22 into the preheater mode. If the engine is off, the control system will enter a normal operating mode with an internal timer function set to a maximum of 40 minutes. If the engine is running, the internal timer will be set to cause a 15 minute operation period.

If the power button 34 is depressed when the preheater unit is already operating, a normal shut down occurs and the display 22 returns to the default mode. Subsequent to a ventilation period of 90 seconds the "ON" lamp indicator is extinguished. During this 90 second ventilation period user actuation of the power button 34 is ignored by the control system 10.

The program button 28 allows the operator to preset one or two predetermined vehicle start times which are stored by the control system 10. The program button 28 also allows already stored preset times to be disabled.

Depressing the program button 28 while the display 22 is not in the preset or preset slew mode causes the currently enabled preset time to be displayed. If neither preset is enabled, preset 1 will be enabled and displayed. Pushing the program button 28 when the display is in either the preset or preset slew mode advances the controller by one state. For example, if preset 1 is enabled, then preset 2 becomes enabled. If preset 2 is enabled, both presets are disabled and if both the presets are disabled, preset 1 is then enabled. If the preheater combustion unit is operating, the program button 28 is ignored.

The "30X" button 26 allows the operator to quickly enter a system shut-down time. Depressing this button once disables any quick set previously entered and displays the time of day. Depressing it again within a 10 second period places the display in the quick-set mode and initially sets the turn-off time for the combustion unit to a time equal to the present time of day plus 60 minutes. The turn-off time corresponds to a desired vehicle start time and subsequent depressions of the "30X" button adds 30-minute increments to this time. A maximum of 12 hours greater than the current time of day can be entered. Pressing of the "30X" button 26, therefore, allows the user to program a time relative to the present time for anticipated vehicle start. This input is ignored when the combustion unit is operating.

The slew buttons 30, 32 are ignored unless the display is in the clock, preset, or slew mode. If the display is in either the clock or preset mode pressing these buttons 30, 32 cause the display to enter the slew mode. Initially, user actuation causes the display 22 to increment or decrement by one minute intervals. Depressing the buttons 30, 32 for more than two seconds causes the display to change by 5 minute intervals every second, engaging the button for six consecutive seconds causes the display to change at a rate of 8.3 minutes per second and if engaged for 12 consecutive seconds the display changes at a rate of 25 minutes per second.

CIRCUITRY

Figure 12:
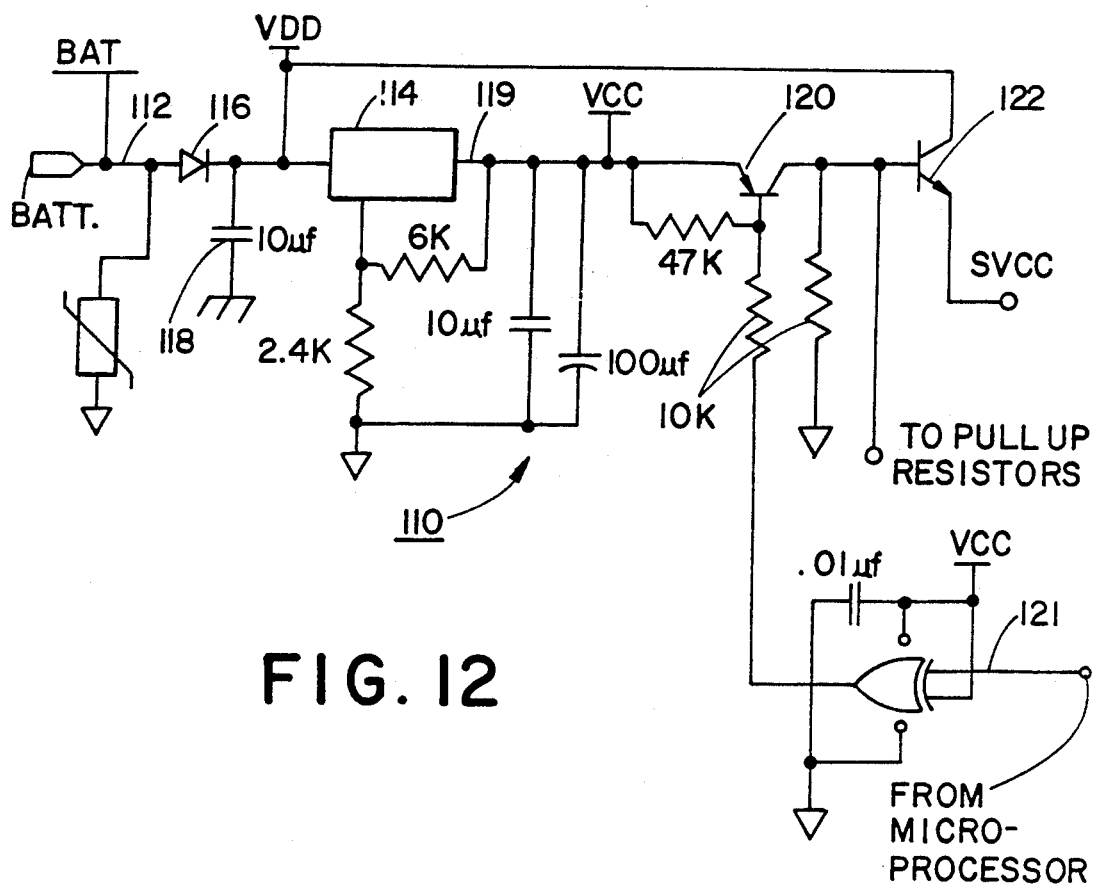
FIG. 12 is a detailed schematic of a power supply for the control system.

The microprocessor 12 depicted in FIG. 3 is energized by a power supply 110 (FIG. 12) having a battery input 112. The power supply incorporates a monolithic, voltage regulated integrated circuit 114. An input to the integrated circuit 114 is protected from negative voltages by a diode 116 and from transient high voltages by a capacitor 118. An output 119 from the integrated circuit 114 supplies power to all circuits requiring a 5 volt signal. A transistor 120 is controlled by an output 121 from the microprocessor 12 and switched on and off to reduce stand-by current. A second transistor 122 is used to generate a switched 5 volt signal SVCC used by the display 22.

The use of switching transistors to control voltage output allows a tightly regulated voltage to be supplied and reduces current dissipation drawn by the display 22. A number of capacitors within the power supply 110 provide noise immunity.

A preferred microprocessor 12 is a National Semiconductor model COP888CF and includes software for performing display functions and actuating the auxiliary heater. A 2.048 megahertz crystal oscillator 130 is coupled to the microprocessor to meet clock and timing requirements.

A power on reset circuit 132 Causes a reset signal to be applied to a reset input 134 of the microprocessor upon power up of the system. Since the +VCC voltage applied to the microprocessor and to the power on reset circuit 132 originates from an output of the voltage regulator before the switching transistor 120, so long as the power supply 110 is coupled to the battery, the microprocessor 12 receives the +VCC input. An internal circuit within the microprocessor also applies a reset signal in the event the microprocessor software is not following a predetermined logic sequence.

The microprocessor 12 monitors input signals which designate the condition of a combustion chamber, the temperature of the coolant within the motor vehicle cooling system, and the actuation state of the vehicle ignition and crank. Default states for these four inputs 136–139 are provided by pull-up or pull-down resistors. The microprocessor also monitors battery voltage VDD through a voltage divider.

AUXILIARY HEATER CONTROL OUTPUTS

Figure 11:
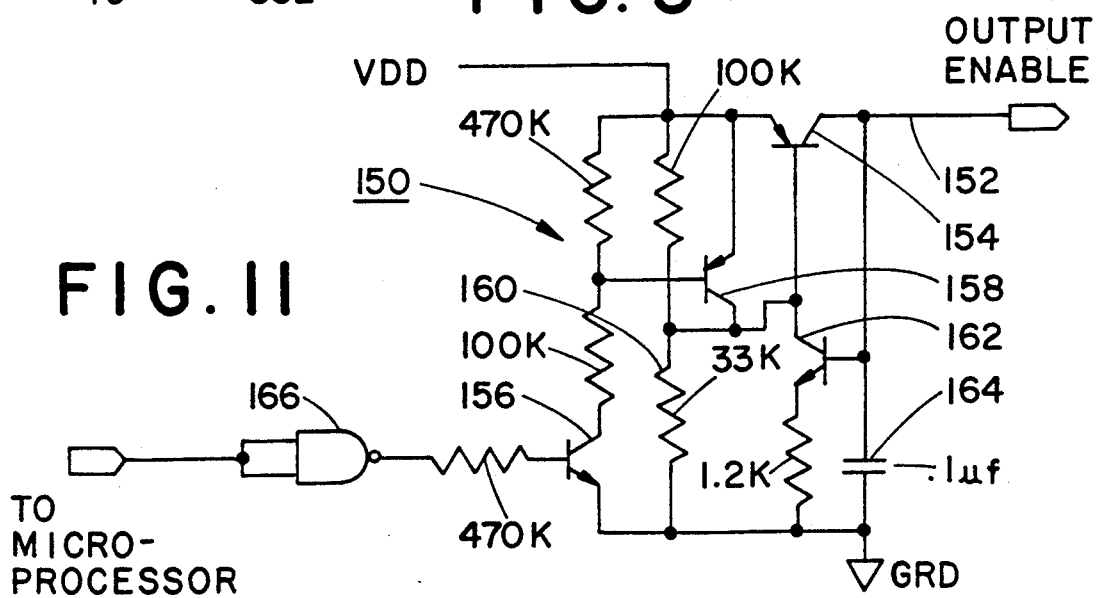
FIGS. 6–11 depict detailed schematics of output interface circuits coupled to the microprocessor depicted in FIG. 3.

Output signals from the microprocessor are used in activating the auxiliary heater. Additionally, an output enable circuit 150 (FIG. 11) provides a signal at an output enable junction 152 indicating the auxiliary heater is on. This is sent to a main vehicle controller which provides a number of other vehicle control features. The voltage at the output junction 152 is controlled from a transistor 154. To turn the transistor 154 off, an output transistor 156 coupled to the microprocessor is turned on. This turns on a second transistor 158, turning off the output transistor 154. When the two transistors 156, 158 are turned off, current across a biasing resistor 160 increases thereby turning partially on a transistor 154. This turns the output transistor 162 on raising the output voltage 152, thereby turning on fully transistor 154. In the event the output 152 of the circuit 150 is shorted to ground the transistor 162 is turned off leaving very little base current in the transistor 154 which results in very little power dissipation. An output capacitor 164 provides noise immunity and an inverter 166 coupled to the microprocessor provides a base current for the transistor 156.

Figure 9:
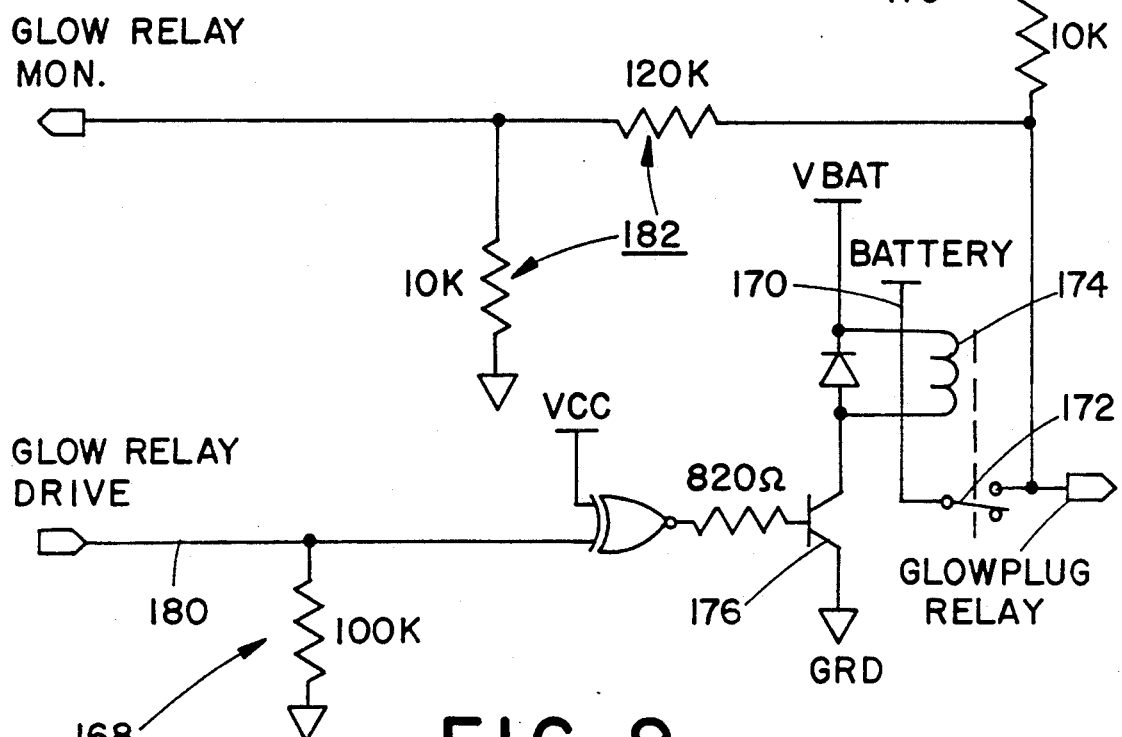

The auxiliary heater combustion chamber includes a glow plug which must be activated to initiate combustion within the heater chamber. This glow plug is activated for a designated period of time prior to the activation of a fuel pump by a circuit 168 depicted in FIG. 9. The glow plug is activated when the battery voltage at an input 170 is transmitted through a contact 172 by energization of a relay coil 174. This coil 174 conducts when a transistor 176 is activated in response to an output from the microprocessor designated "glow plug relay drive" 180. The output signal from the contact 172 is fed back through a voltage divider 182 to the microprocessor 12.

Figure 7:
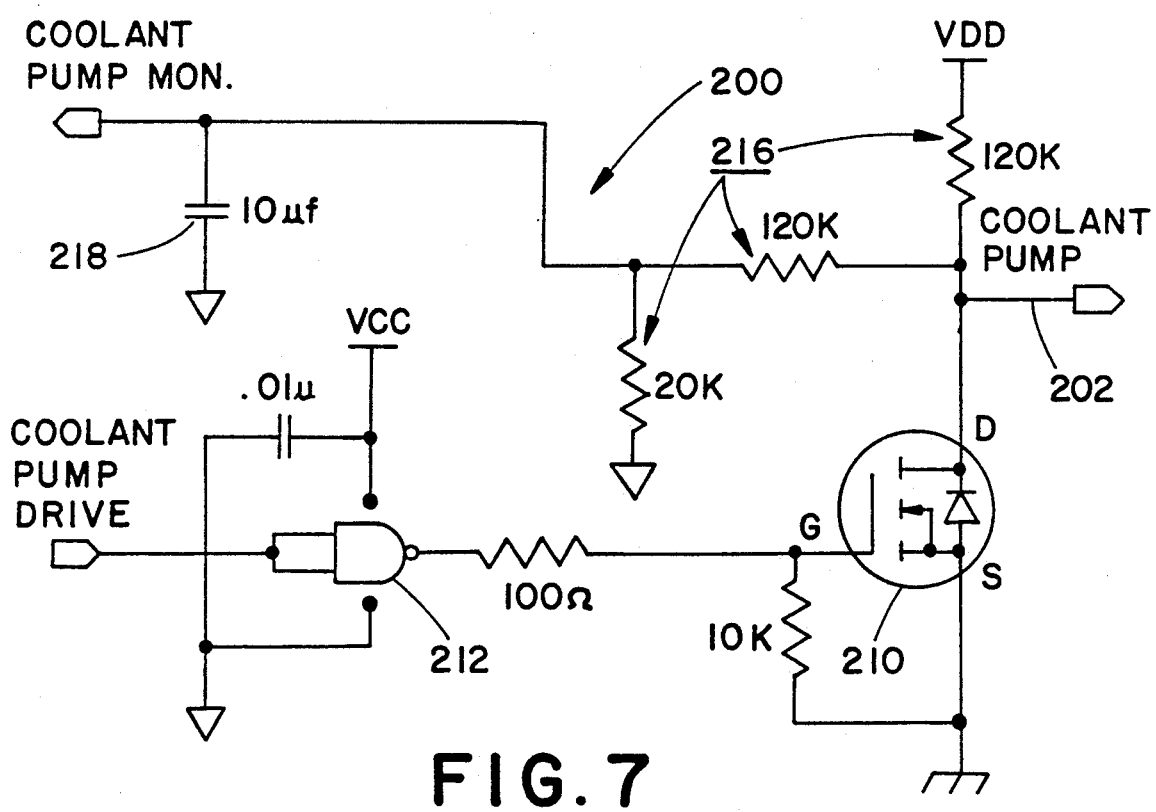

A coolant pump circuit 200 (FIG. 7) generates an output 202 that is controlled by a MosFet transistor 210. A CMOS nand gate 212 is used to provide the voltage levels required for this transistor 210. The output voltage at the transistor drain is fed back to the microprocessor by a network 216 of three resistors. Three different monitor voltages are sensed for three distinct conditions: (a) load present; (b) load open; and (c) drive transistor "ON" or shorted. The load shorted or drive open conditions are detected by the failure of the output 202 to go low when the drive transistor 210 is being turned "ON." A capacitor 218 is used to provide noise immunity to the resistor divider network.

Figure 6:
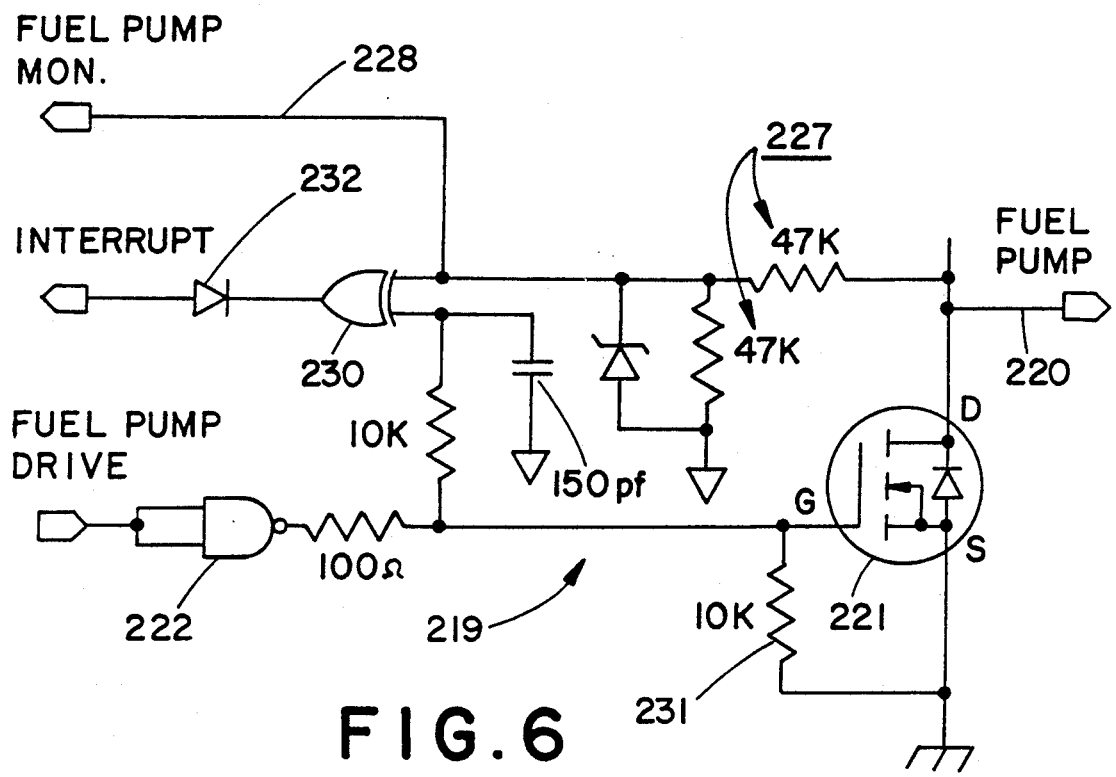

FIG. 6 depicts a circuit 219 for generating an auxiliary fuel pump output 220. The auxiliary fuel pump is driven by a MosFet transistor 221. A CMOS nand gate 222 is used to provide the voltage levels required for this transistor. The output voltage is divided by a network of three resistors 227 which supply a different monitor output 22 (and hence detection capability) for three distinct conditions: (a) load present; (b) load open; and (c) drive transistor "ON" or shorted. Load shorted or drive open are detected by the failure of the output 220 to go low when the microprocessor attempts to turn on the transistor 221. The monitored feedback signal is also compared to the drive signal at the transistor gate using a CMOS Exclusive OR gate 230 which generates an interrupt to the microprocessor 12 when the drive and the output do not match. A resistor 231 provides noise immunity and better turn-off characteristics for output transistor 221. A signal diode 232 couples an output from the OR gate 230 to the interrupt line 234 (FIG. 3) of the microprocessor 12.

Figure 8:
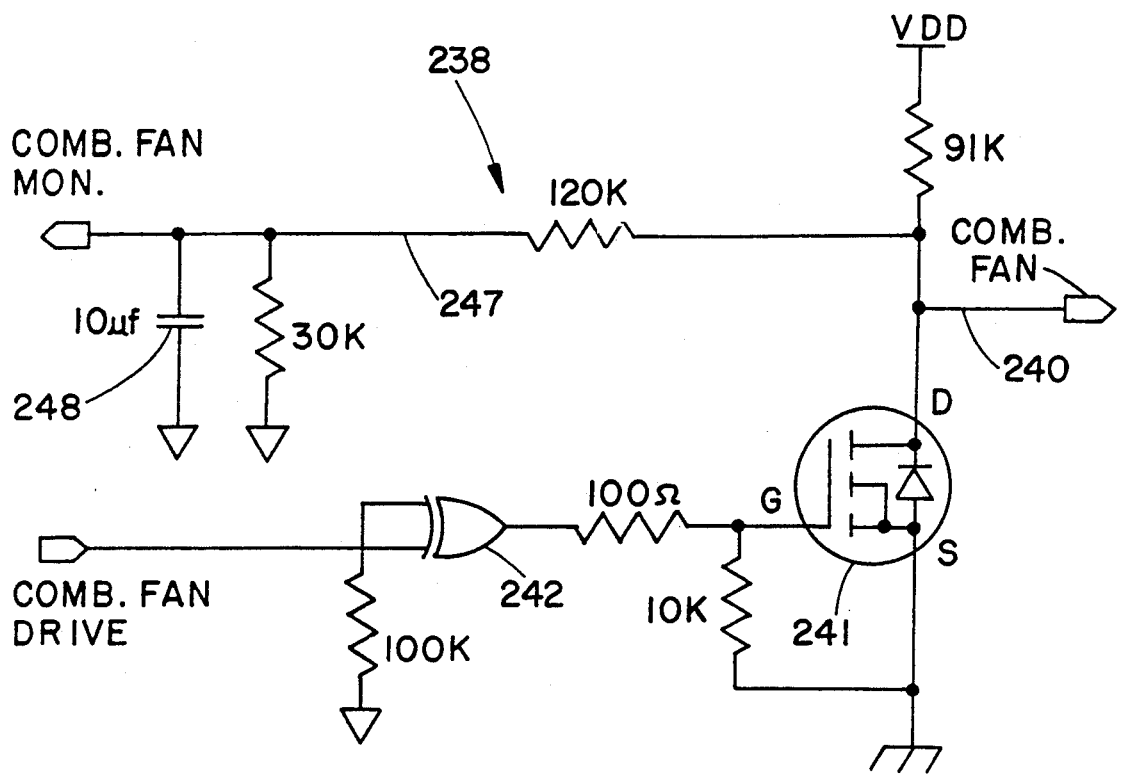

FIG. 8 depicts a circuit 238 that generates combustion fan output 240. The combustion fan is driven by a low-side MosFet transistor 241. A CMOS exclusive or gate 242 is used to provide the voltage levels required for this transistor. The output voltage is divided by a network of three resistors which supply different voltages on a monitor output 247 (and hence detection capability) for the three conditions of: (a) load present; (b) load open; and (c) drive transistor 241 "ON" or shorted. Load shorted or drive open are detected by the failure of the output to go low when the drive transistor 241 is being turned "ON." A capacitor 248 is used to provide noise immunity to the resistor divider network.

COMPARTMENT FAN OUTPUT

Figure 10:
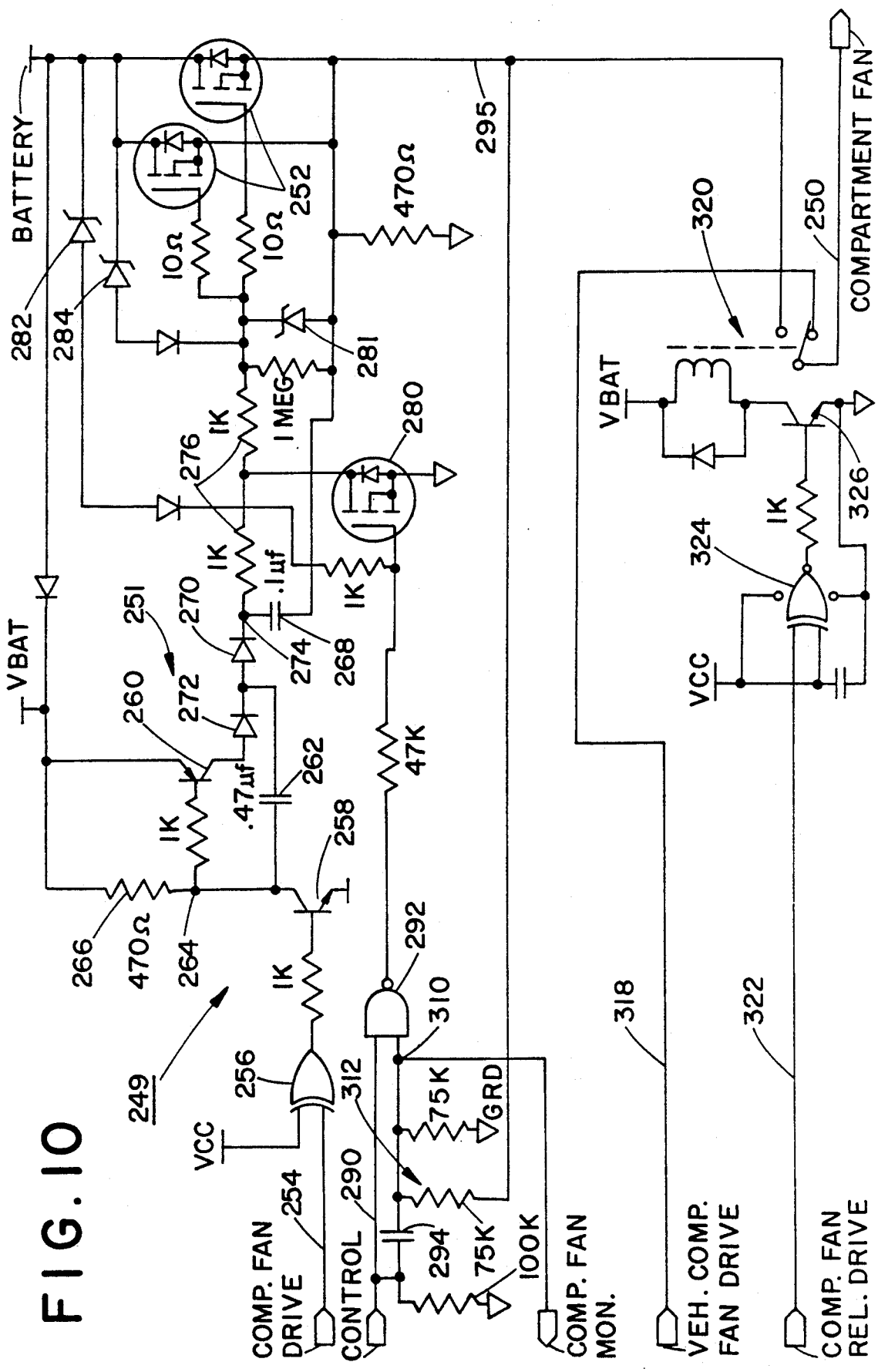

FIG. 10 depicts a circuit 249 for generating a compartment fan output 250. A voltage doubler 251 provides the high voltage required to drive two output transistors 252. A compartment fan drive signal 254 from the microprocessor 12 controls the operation of the doubler. When the signal 254 is low, an exclusive or 256 provides the base drive necessary to turn on a transistor 258, which in turn, turns on a transistor 260. These two transistors cause a capacitor 262 to be charged to battery voltage. When the drive signal 254 goes high, turning the transistors 258, 260 off, a node 264 is pulled high by a resistor 266. The voltage across the capacitor 262 hence appears momentarily at approximately twice the battery voltage, charging a second capacitor 268 through a diode 270. A second diode 272 eliminates a discharge path for the capacitor 262. As a result, as long as the drive signal 254 is cycling, a voltage at approximately twice the battery voltage will be maintained at a junction 274.

The important aspect of this design is that in steady state operation, when both transistors 258, 260 are off, the circuit does not draw current.

An output drive section contains the two power transistors 252 that drive the load. The gate drive voltage for the transistors 252 is supplied by the voltage doubler section 251 through two resistors 276. A small signal MosFet 280 is used to switch the gate voltage to these transistors 252 ON and OFF. The output transistors are current limited to keep them in a safe operating area by limiting their gate voltages with a zener diode 281. For voltages exceeding the normal operation, the zener 282 turns the control transistor 280 on, turning the output transistors 252 off.

The microprocessor 12 enables the system by driving a compartment fan control signal 290, connected to one input of a NAND gate 292, high. A capacitor 294 causes the other input of the NAND gate 292 to go momentarily high. The output of the gate 292 goes low, turning the control transistor 280 off, and turning the output transistors 252 on. The output 295 of the transistors 252 is fed back to a node 310 through a voltage divider 312. If the output does not go high within a given time period, the node 310 will return to low, hence turning the outputs off. The time period allowed is calculated such that the output transistors are able to operate with a short-circuited load without damage. The voltage at the node 310 is fed back to the microprocessor 12 for monitoring.

In the vehicle, the compartment fan is normally driven by the climate control system. To allow normal operation of the vehicle, the compartment fan output 250 is connected to a climate control signal 318 through the normally closed contacts of a single-pole-double-throw (SPDT) relay 320. When the microprocessor 12 is required to drive the fan, it drives a compartment fan relay drive signal 322 high. A buffer 324 provides the base drive required to turn on a relay drive transistor 326. When the relay pulls in, it disconnects the output 250 from the normal control signal 318 and connects it to the signal from the transistors 252.

DISPLAY

Figure 4:
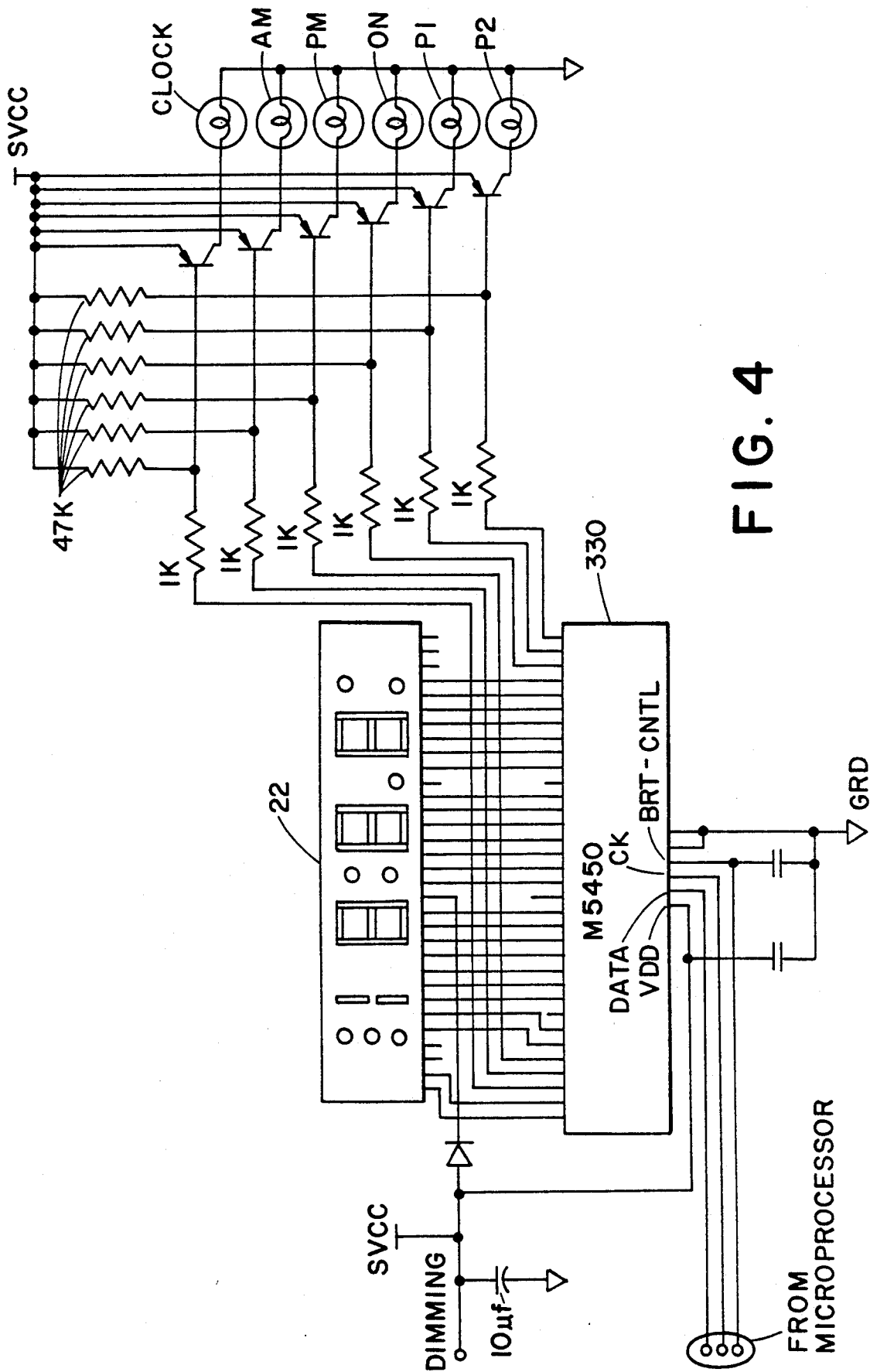
FIG. 4 is a circuit for actuating the panel display shown in FIG. 2.

FIG. 4 depicts a display driver circuit 328 for activating the display 22. This circuit 328 includes a switched power input SVCC for energizing an integrated circuit 330 for controllably illuminating light emitting diodes of the display 22. The switched input SVCC is provided from the control output of the transistor 122 (FIG. 12) and only energizes the circuit 330 under microprocessor control based on the signal at the base of the transistor 120. This reduces current drawn by the display 22 when no auxiliary heater control or display functions are performed. The switched power input to the FIG. 4 circuit also allows the integrated circuit 330 to activate the series of 6 light emitting diodes to the left and right of the display 22.

Data from the microprocessor 12 is presented on three inputs 331$a$, 331$b$, 331$c$ to the circuit 330. These inputs allow the microprocessor to present data on the input 331$a$, clock that data into the circuit 330 via the input 331$b$ and control display brightness with the input 331$c$.

Figure 5:
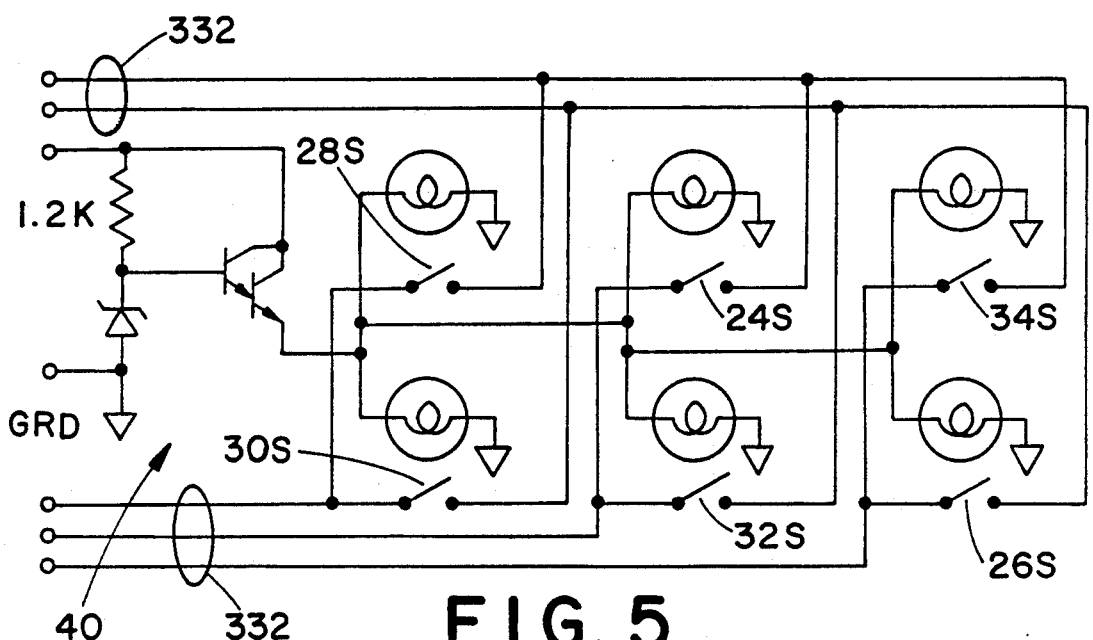
FIG. 5 is a schematic of circuitry for accepting user inputs and transmitting those inputs to the control system.

The various push button switch inputs 24$s$, 26$s$, etc. on the display panel 20 are configured as depicted in the FIG. 5 circuit 40. Actuation of the various switches on the input panel 20 causes the status of a five line output 332 to be transmitted back to the microprocessor 12 indicating the status of these switches.

CONTROL FLOW CHART

Figure 16A:
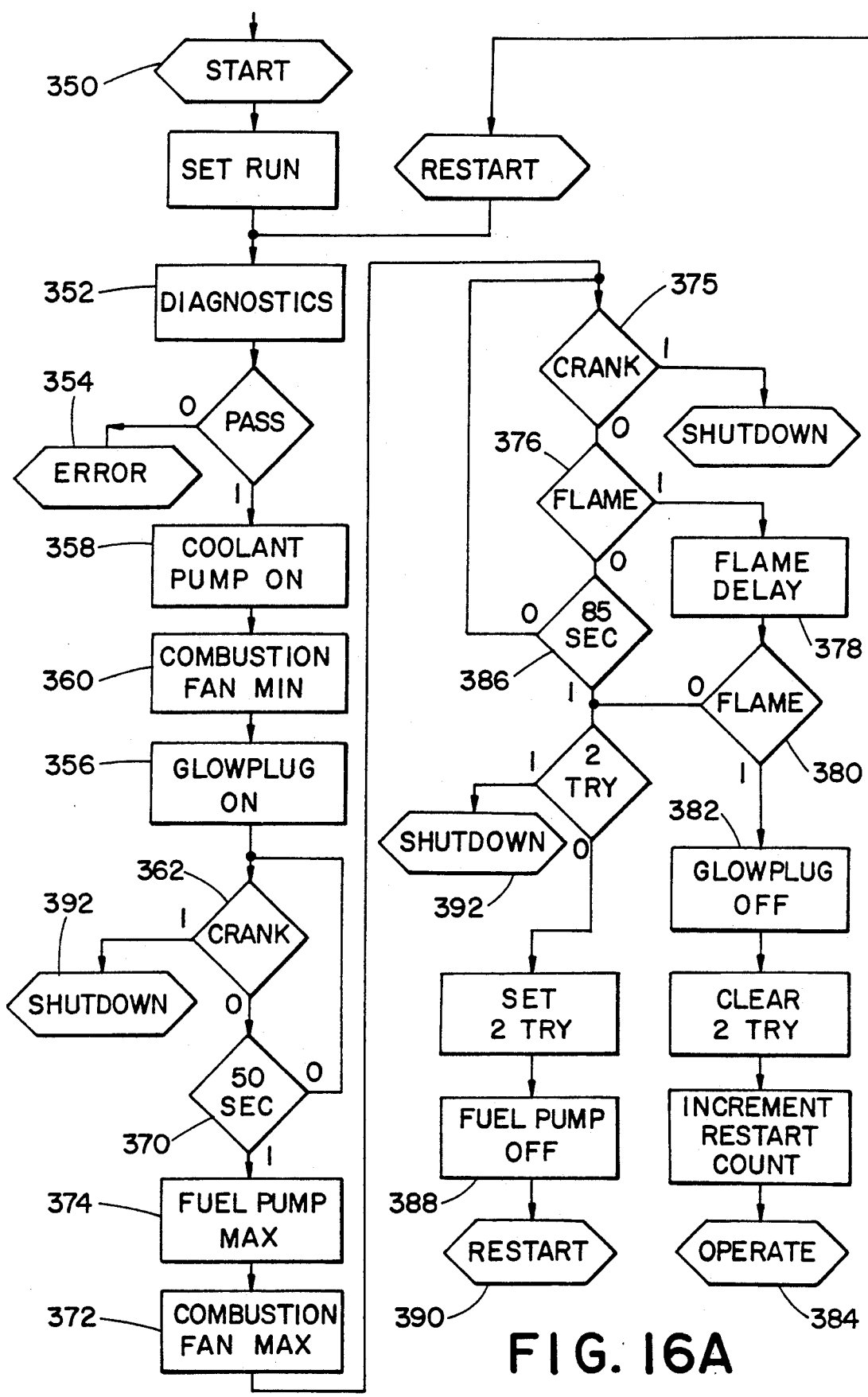
FIGS. 16A–16C depict a control algorithm executed by a microprocessor controller in the FIG. 1 control unit.
Figure 16B:
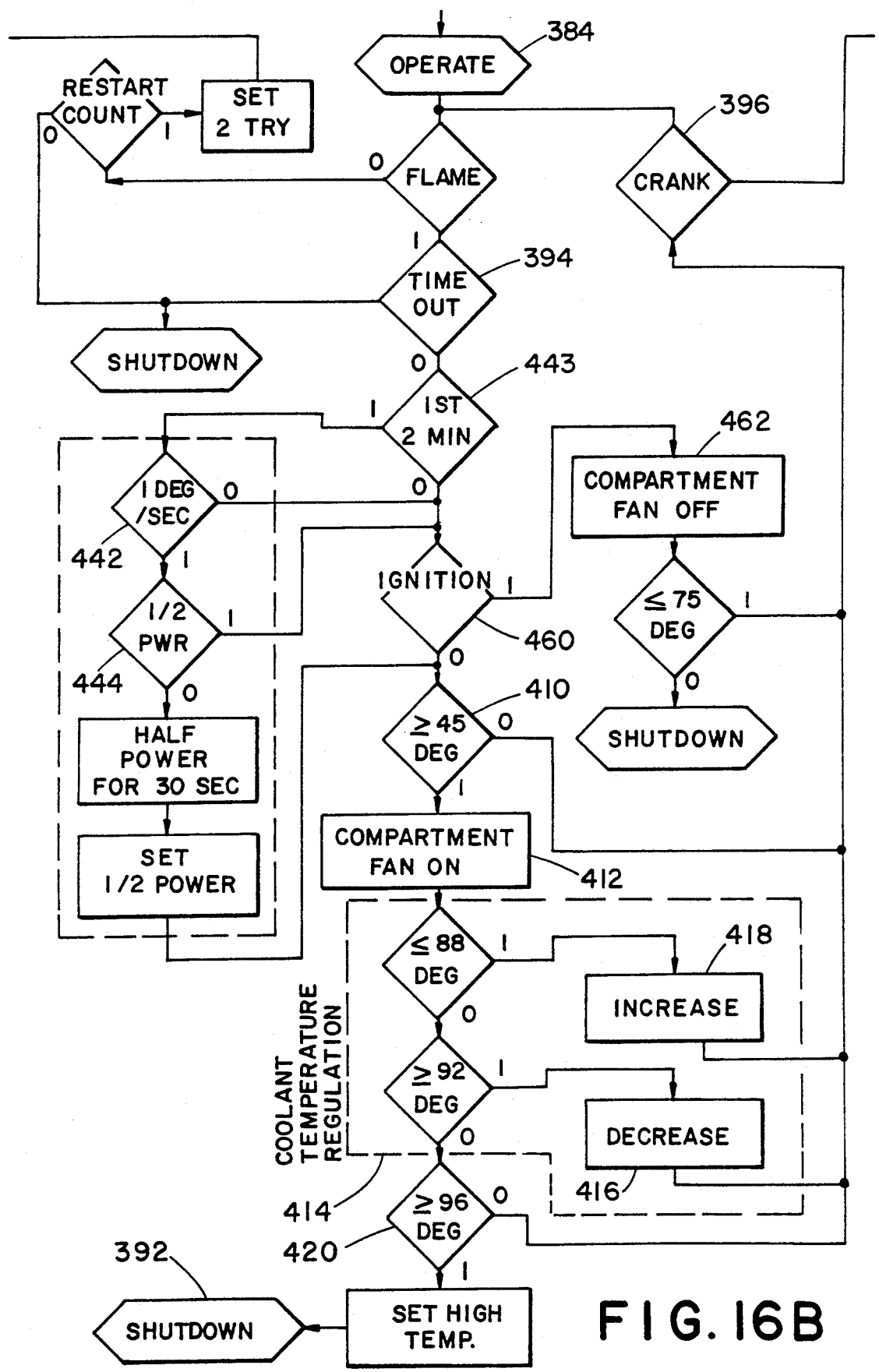
Figure 16C:
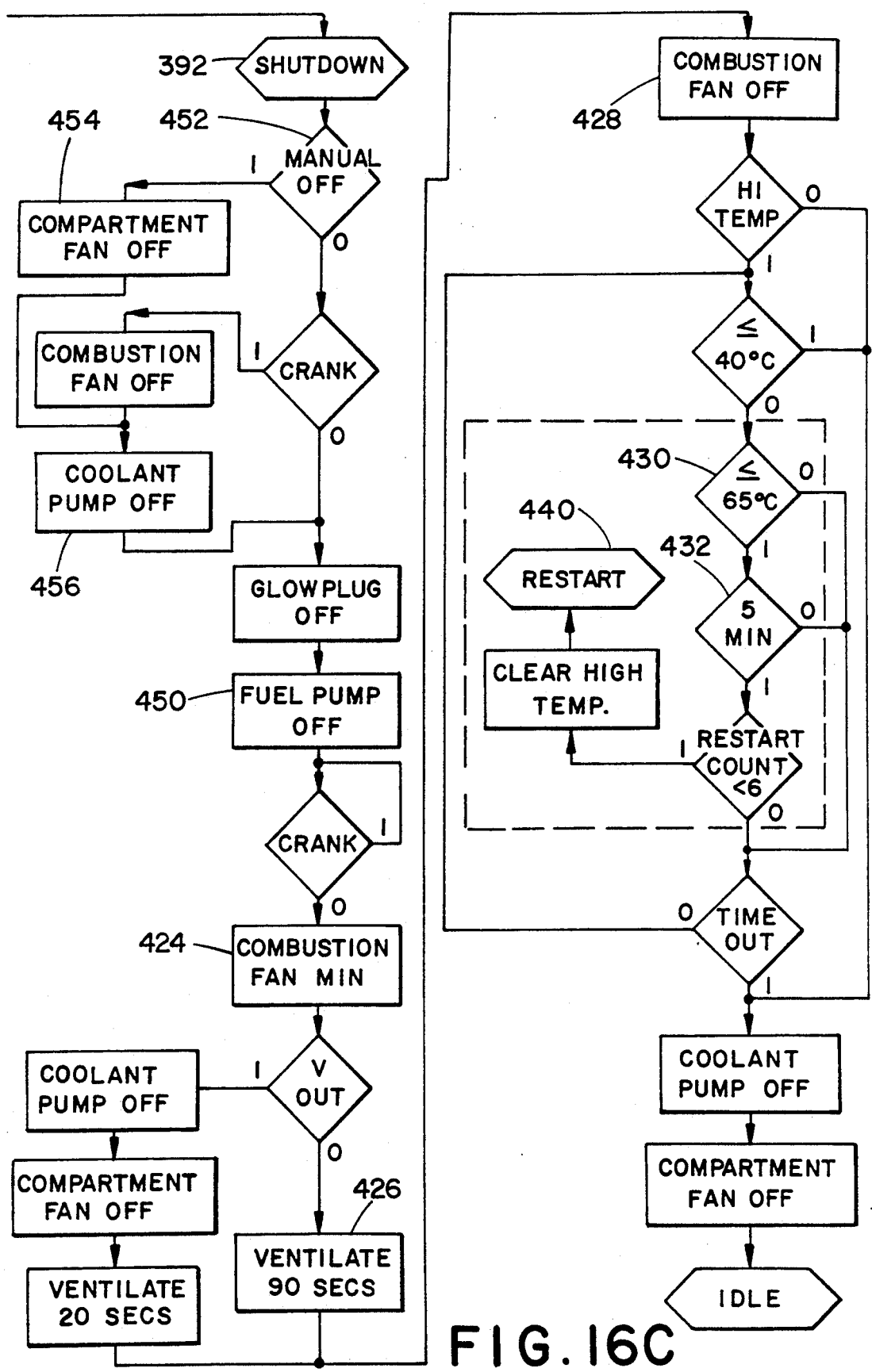

FIGS. 16A-16C depict in flow chart form the different stages of control system operation. During start up 350 of the auxiliary preheater, the microprocessor enters a 5 second diagnostic stage 352 that executes a self-test algorithm. If this test reveals fault condition, the display enters the error mode displays error messages 354.

If the diagnostic test is passed the microprocessor 12 performs the steps of energizing the glow plug 356, switching on the enable output 152 and providing power to the coolant pump 358. Additionally, the combustion fan is driven 360 at low speed. The microprocessor 12 next checks 362 to see if the engine is cranking. If it is cranking, a shutdown algorithm is performed. Following a 50 second glow period 370 the combustion fan is driven 372 at maximum speed and the fuel pump is switched on at a maximum rate 374 to facilitate heater unit combustion. Combustion typically occurs within 5 to 20 seconds of the fuel pump start up.

Figure 15:
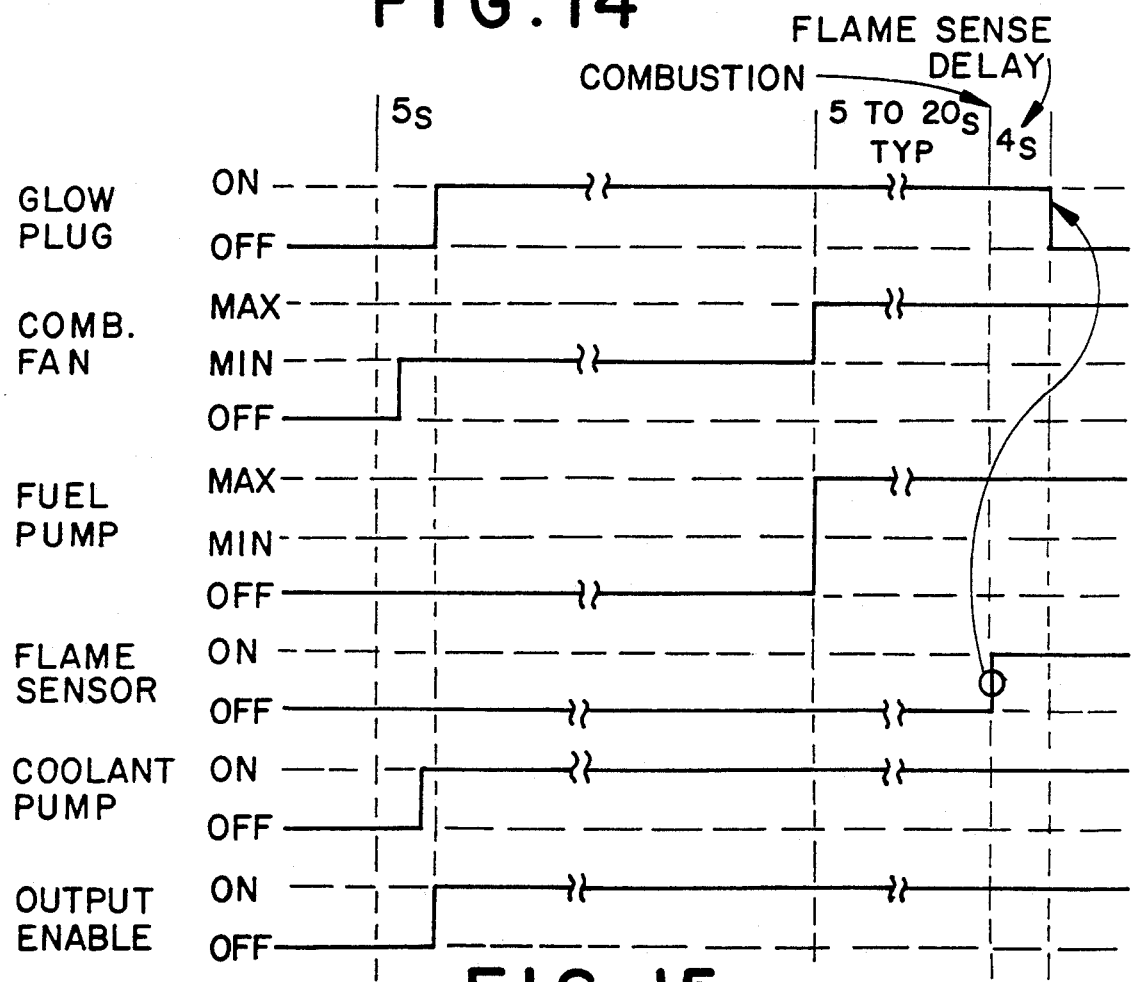
FIG. 15 is a timing diagram showing the status of output signals from the microprocessor to initiate auxiliary heater operation.

After another check 375 to see if the engine is cranking, the microprocessor checks 376 for the presence of a flame. If a flame is sensed, a 4 second flame sensing delay 378 is begun. If at the end of this period the flame is still sensed 380 the glow plug output is disabled 382 and the system enters its operating mode 384. This sequence is schematically depicted in FIG. 15.

As noted, if combustion is to occur, it typically begins within 5 to 20 seconds of fuel pump actuation. If combustion is not sensed within an 85 second delay period 386 after fuel pump start up, the microprocessor 12 shuts off the fuel pump 388 and reduces the combustion fan speed. A second 50 second glow period is conducted and the combustion fan again driven at a maximum rate and the fuel pump actuated. During this second start attempt 390 the microprocessor again waits 85 seconds to determine if the combustion has been initiated. If the second attempt fails the microprocessor 12 disables the glow commences system shut down 392 by entering an error mode.

During the operation mode 384 of the auxiliary heater the microprocessor 12 regulates the coolant temperature based upon an input from the coolant temperature sensor. During this mode 384, flame and crank tests 394, 396 are active to test for the presence of a flame and whether the starter is operating. The fuel pump operates at a maximum rate and the combustion fan operates at a maximum speed. When sensing 400 of the coolant temperature indicates the coolant has reached 45° C., the compartment fan is also turned on 412 by the microprocessor 12.

Figure 13:
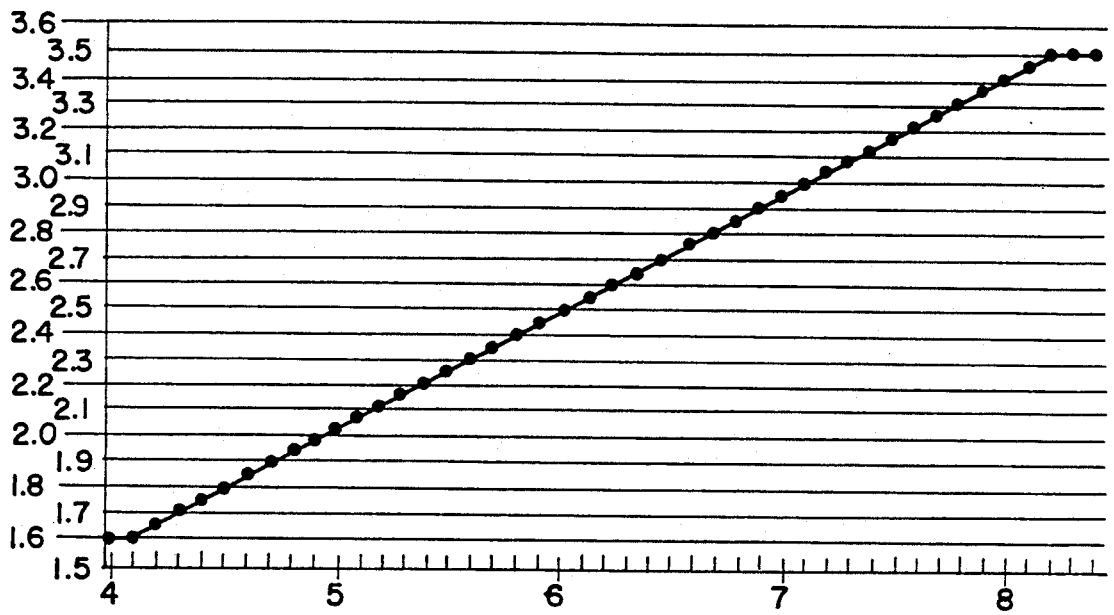
FIG. 13 is a graph showing a relation between auxiliary fuel pump speed and combustion fan speed.

The fuel pump and combustion fan continue to run at maximum rate until the coolant temperature reaches 90° C. Subsequent to reaching this temperature, the microprocessor 12 enters a stage 414 in which it regulates the operation of the combustion fan and fuel pump to maintain a coolant temperature of 90°±2° C. When the coolant temperature reaches 92° for a 5 second interval, the fuel pump rate is decreased 416 by 1/10 of a hertz and the combustion fan speed is reduced a corresponding amount. (FIG. 13 depicts a relation between fuel pump frequency and fan speed.) This reduction in speed is maintained until the temperature drops to a level of 88° C. for a 5 second interval. When this occurs the frequency of the combustion fan is increased 418 by 1/10 of a hertz as is the fuel pump rate. If, after 5 seconds, the fuel pump rate and combustion speeds remain at the previously encountered coolant temperature limit, another increase or decrease in these rates will be implemented.

If coolant temperature exceeds 96±2° C., this is sensed 420 and the microprocessor 12 records this fact 422 and enters a shut down stage 392. During the shut-down stage 392 the combustion fan speed is reduced 424 to a minimum for a 90±5 second ventilation period. After this ventilation time period 426 the combustion fan is turned off 428. If the coolant temperature subsequently reaches 430 65±3° C., the microprocessor determines 432 there is greater than five minutes of preheater system run time remaining and if the heater unit has not already been restarted six times during this operational period, the microprocessor will initiate a restart 440 by switching on the glow plug output and switching on the combustion fan at minimum speed. The normal glow period and combustion attempts follow. If a restart is not to be initiated, the coolant pump and compartment fan will continue to run until the coolant temperature reaches 40±3° C., at which time they will be turned off and the display returned to the Default mode. An error occurrence indication is also stored and will be flashed on the display when the error mode is entered.

In extreme cold temperatures the coolant may initially be so viscous that it cannot transfer heat away from the heater unit effectively. To combat this condition, the microprocessor determines 442 the coolant temperature rate of change during a first two minute period 443 of system operation immediately following combustion. Should the controller sense coolant temperature increase at a rate equal to or greater than one degree Celsius per second for a 25±2 second period the controller will reduce 444 the fuel pump rate and combustion fan speed to minimum for 30±2 seconds. At the end of the 30 second period to maximum coolant pump will return to maximum until modified by normal system regulation.

Should the coolant temperature rate continue to increase at a rapid rate, an overheat protection circuit will protect the heater unit. This protection circuit consists of a bimetal, thermostat that opens at 115±2° C., in series with the fuel pump drive line. If the system is shut down by this thermostat (causes a blowout condition that is not recovered from), following the occurrence of an extreme cold temperature excursion induced half power mode, the Diagnostic mode will be entered and flash an error message.

If the heater unit combustion halts during normal operation a flame blow out has occurred. The controller detects this condition by the loss of a flame sensor signal. If the heater unit has already been successfully retarted six times during the current operational period, a normal shutdown will be commenced. Otherwise, upon recognizing a blow out, the controller shuts off the fuel pump, reduces the combustion fan speed to minimum and activates the glow plug output. A glow period and restart attempt follow. If the heater unit fails to achieve combustion, the glow plug output will be disabled and shutdown commenced. When the error mode is entered at a later time an error message is indicated on the display.

When the microprocessor times out indicating the combustion unit has operated for the desired time interval, the operator manually turns off the system by depressing the PWR switch, or the coolant temperature reaches 75° C. when the vehicle's engine is running, a shutdown will commence. The fuel pump is turned off 450 and the combustion fan speed reduced 424 to minimum. If the system is being shut down in response to a manual command 452 the coolant pump and, if required, the compartment fan will also be shut off 454, 456 at this time. The 90 second ventilation period occurs next. At the end of this period the enable signal, combustion fan and, if not already off, the coolant pump and compartment fan are turned off.

If, at any time during preheater system operation, vehicle ignition is sensed 460, the compartment fan output will be disabled 462, returning control to the vehicle operator. If engine cranking occurs, all preheater outputs will be disabled and the timer reset to zero. Immediately following cranking, the heater unit will be ventilated for 90 seconds. Engine start disables presets and quick set. While the engine is running, the preheater can only be activated manually or by auto start. (A preset or quickset will not activate the system when the engine is running.)

If the battery voltage is less than 11.5 volts for more than 20 seconds or exceeds 16.0 volts, a voltage protection shutdown will occur. The fuel pump, coolant pump and compartment fan will be turned off and the combustion fan reduced to minimum speed. Following a 90 second ventilation period the combustion fan will be shut off. When the error mode is entered an appropriate error message flashes. On errors detected during operation, the user will be notified by displaying "ERX", where "X" is in error code.

A self test will be executed each time the preheater system commences an operational period. If any faults are detected, the system will shut down, record the error in failure history RAM which (can save ten error codes—should more than ten errors accumulate, the ten most recent errors will be saved), and inform the operator of the fault by displaying "SER".

Similarly, when a technician manually evokes the Diagnostic mode, the self test is performed. After a five second period, any faults that occurred will be reported with the appropriate error code(s). Each code will be displayed for ten seconds. If more than one fault is found, the error codes will be displayed in numeric sequence, one after another. After displaying each code three times the controller will enter a history mode wherein saved error codes in ram can be viewed by pressing the up key once for each code and then return to the Default mode.

The following error messages "00" "01," etc. are displayed in response to the corresponding sensed conditions.

| | |
|---|---|
| 00 | System functioning properly |
| 01 | Flame sensor shorted |
| 02 | Coolant sensor open |
| 03 | Coolant sensor shorted |
| 04 | Battery voltage low |
| 05 | Battery voltage high |
| 06 | Glow plug not connected or open/driver short |
| 07 | Glow plug relay shorted/driver open |
| 08 | Coolant pump not connected or open/driver short |
| 09 | Coolant pump shorted/driver open |
| 10 | Fuel pump not connected or open |
| 11 | Fuel pump shorted/driver open |
| 12 | Fuel pump driver short |
| 13 | Combustion fan not connected or open |
| 14 | Combustion fan shorted/driver open |
| 15 | Combustion fan driver short |
| 16 | Compartment fan not connected or open |
| 17 | Compartment fan shorted |
| 18 | Compartment fan driver fault |
| Er1 | Two-try start failure |
| Er2 | Blow out failure |
| Er3 | Too many starts attempted |
| Er4 | Out of tolerance voltage during operation. |
| Er5 | Temperature excursion. |
| SEr | Self test failure. Have system serviced. |

MECHANICAL MOUNTING

Figure 19:
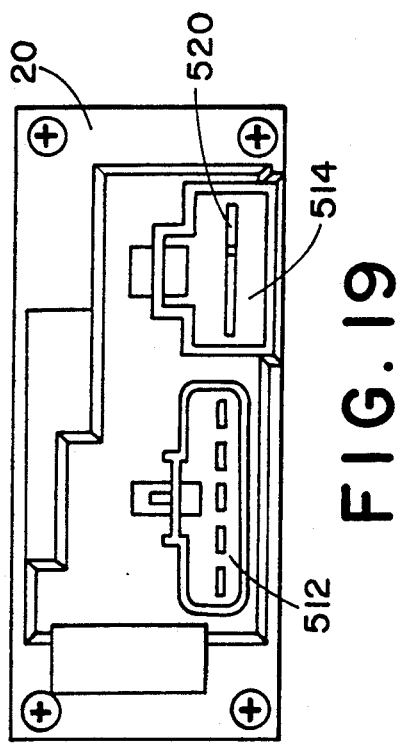
FIG. 19 is a rear elevation view of the FIG. 17 mounting assembly.
Figure 17:
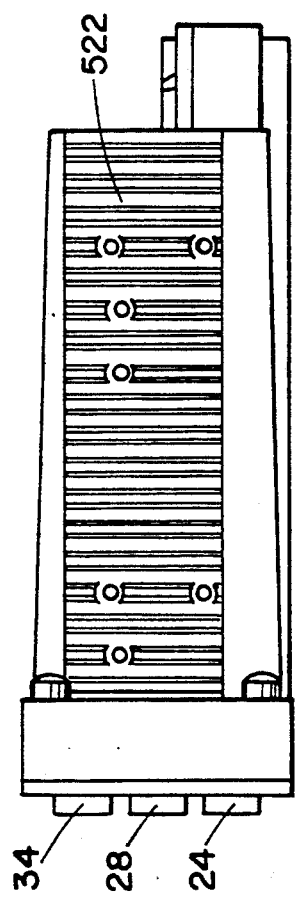
FIG. 17 is a side elevation view of a mounting assembly for the panel display and control system.
Figure 18:
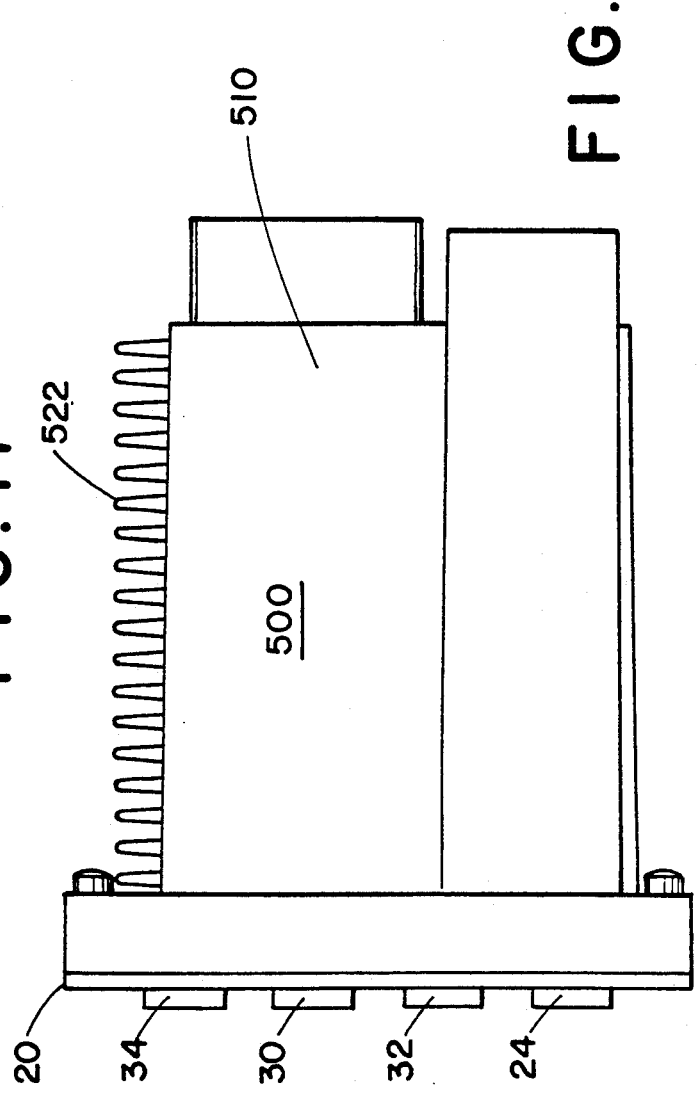
FIG. 18 is a top plan view of the FIG. 17 mounting assembly.

A mounting assembly 500 for supporting the control system 10 is depicted in FIGS. 17-19. The mounting assembly 500 supports the display panel 20 for mounting on a vehicle dashboard. In an after market installation of a combustion unit the assembly 500 can be mounted using suitable mounting brackets.

The microprocessor 12 and interface circuitry coupled to the microprocessor is mounted on a printed circuit that fits within a housing 510. At the rear of the housing 510 two connector sockets 512, 514 support multiple terminals for routing energization, monitoring and activation signals into and out of the housing 510. In the preferred embodiment the board that supports the microprocessor 12 includes an edge connector 520 that is exposed at the region of the socket 514 for engagement with a suitably configured connector.

A heat sink 522 along one side of the housing 510 dissipates heat that builds up in the housing due to operation of the control system 10.

Although the invention has been described in its preferred form with a certain degree of particularity, it is understood that the present disclosure of the preferred form has been made only by way of example and that numerous changes in the details of construction and the combination and arrangement of parts may be reported to without departing from the spirit and the scope of the invention as hereinafter claimed.

We claim:

1. Apparatus comprising:
   a. an auxiliary heating system for transferring heat to a motor vehicle prior to start-up of a motor vehicle engine including:
      i. an auxiliary energy source separate from said motor vehicle engine for transferring heat to a motor vehicle engine cooling system; and
      ii. an auxiliary pump for moving a coolant through said motor vehicle engine cooling system as heat is transferred to said cooling system from said auxiliary energy source;
   b. input means mounted to said vehicle in a location accessible to a motorist and including one or more input switches for actuating the auxiliary heating system;
   c. control means coupled to said input means to initiate operation of said auxiliary energy source prior to a projected vehicle start time; said control means including:
      i. a memory for storing said projected vehicle start time as entered by the motorist through the one or more input switches; and
      ii. activator for means coupled to the auxiliary energy source for activating the auxiliary energy source; and
   d. sensor means for sensing a temperature of said coolant prior to operation of said auxiliary energy source and coupling a signal corresponding to said temperature to the control means for enabling said control means to determine a time interval said auxiliary energy source is to operate based upon said sensed temperature and the projected vehicle start time.

2. The apparatus of claim 1 wherein said control means comprises timer means for automatically actuating said auxiliary energy source a predetermined time prior to said projected vehicle start time based upon said temperature of said coolant.

3. The apparatus of claim 1 wherein said control means comprises:
   a. means for determining said temperature of coolant in said vehicle cooling system a predetermined time prior to said projected vehicle start time; and
   b. means for actuating said auxiliary energy source in a controlled manner based upon said sensed temperature of said coolant.

4. The apparatus of claim 1 wherein said control means memory comprises means for storing a plurality of preset target ignition times and wherein said activator means activates said auxiliary energy source prior to each of said plurality of said preset target ignition times.

5. The apparatus of claim 1 wherein said auxiliary source comprises:
   a. combustion chamber;
   b. a glow plug for initiating combustion within said combustion chamber;
   c. a fuel pump for routing fuel to said combustion chamber; and
   d. a combustion fan.

6. The apparatus of claim 1 wherein said input means and control means are mounted to a common mounting assembly within a housing and wherein the housing includes a visual display for displaying a time of day to allow said projected vehicle start time to be selected by the motorist through activation of said one or more input switches.

7. The apparatus of claim 6 wherein said visual display comprises means for indicating a status of auxiliary energy source operation.

8. A method of heating a motor vehicle with an auxiliary heater prior to starting a motor vehicle engine comprising the steps of:
   a. setting a motor vehicle start time corresponding to a projected start of said motor vehicle engine;
   b. at a predetermined time prior to said start time sensing an ambient temperature; and
   c. based on said sensed ambient temperature activating said auxiliary heater at a time prior to said start time to heat said motor vehicle.

9. The method of claim 8 wherein in addition to activating said auxiliary heater, a fan for transferring heat to said passenger compartment is also activated.

10. Control apparatus for controlling operation of an auxiliary vehicle heater comprising:
    a. input means mounted to a vehicle in a location accessible to a vehicle operator and including one or more operator actuatable switches for actuating one or more auxiliary heating control functions;
    b. control means coupled to said input means for initiating operation of said auxiliary vehicle heater prior to a projected vehicle start time entered by actuation of the one or more operator-actuable switches;
    c. sensor means for sensing a temperature of a coolant and transmitting a signal corresponding to the temperature to said control means to enable the control means to determine a time interval the auxiliary energy source is to operate based upon said sensed temperature; and
    d. support means for mounting said input means and control means to position said input means in a convenient location for operator input and for enclosing said control means within a housing.

11. The control apparatus of claim 10 wherein the input means comprises a display for displaying a time of day which can be changed by actuation of the one or more operator-actuable switches to adjust the projected vehicle start time.

12. Apparatus comprising:
    a. an auxiliary heating system for transferring heat energy to a motor vehicle engine cooling system comprising:
       i. a combustion heater having an igniter which, when energized causes a fuel to burn and give off energy for heating a coolant within said cooling system; and
       ii. a pump for circulating heated coolant through said cooling system to transfer heat away from said coolant;
    b. an igniter circuit for energizing said igniter;
    c. control circuitry including an output for activating said igniter circuit at a time before an anticipated vehicle start time based upon sensed temperature;
    d. a sensor for monitoring an ambient temperature and coupling a signal corresponding to the ambient temperature to said control circuit;
    e. an input unit mounted a vehicle passenger compartment for transmitting a projected vehicle start time to said control circuit; and
    f. said control circuit determining an igniter activation time based upon sensed temperature and projected vehicle start time.

13. Apparatus comprising:
a. means for transferring heat to a motor vehicle prior to start-up of a motor vehicle engine including:
   i. an auxiliary energy source separate from said motor vehicle engine for transferring heat to a motor vehicle engine cooling system; and
   ii. a pump for routing a coolant through said motor vehicle engine cooling system as heat is transferred to said cooling system;
b. input means mounted to said vehicle in a location accessible to a motorist for actuating one or more auxiliary heating control functions;
c. control means coupled to said input means to initiate operation of said auxiliary energy source prior to a projected vehicle start time, said control means comprising:
   i. a timer for storing said projected vehicle start time;
   ii. means for sensing said temperature of coolant in said vehicle cooling system a predetermined time prior to said start time; and
   iii. means for actuating said auxiliary energy source in a controlled manner based upon said sensed temperature of said coolant; and
d. sensor means for sensing a temperature of said coolant for enabling said control means to determine a time interval said auxiliary energy source is to operate based upon said sensed temperature.

14. A method of heating a motor vehicle with an auxiliary heater prior to starting a motor vehicle engine comprising the steps of:
a. setting a motor vehicle start time corresponding to a projected start of said motor vehicle engine;
b. at a predetermined time prior t said start time sensing a temperature of a motor vehicle coolant; and
c. based on said sensed coolant temperature activating said auxiliary at a time prior to said start time to heat said motor vehicle.

* * * * *